(12) United States Patent
Yetukuri et al.

(10) Patent No.: US 11,440,495 B2
(45) Date of Patent: Sep. 13, 2022

(54) OCCUPANT PROTECTION SYSTEM FOR A VEHICLE SEAT

(71) Applicant: Lear Corporation, Southfield, MI (US)

(72) Inventors: Arjun Yetukuri, Rochester Hills, MI (US); Mladen Humer, West Bloomfield, MI (US); Karl Henn, New Hudson, MI (US); Peter Festag, Erding (DE)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 17/231,807

(22) Filed: Apr. 15, 2021

(65) Prior Publication Data

US 2021/0229615 A1 Jul. 29, 2021

Related U.S. Application Data

(63) Continuation of application No. 16/243,595, filed on Jan. 9, 2019, now abandoned.
(Continued)

(51) Int. Cl.
*B60R 21/055* (2006.01)
*B60R 21/207* (2006.01)
(Continued)

(52) U.S. Cl.
CPC .......... *B60R 21/055* (2013.01); *B60R 21/207* (2013.01); *B60R 21/231* (2013.01); *B60R 21/2334* (2013.01); *B60R 21/26* (2013.01); *B60R 2021/0032* (2013.01); *B60R 2021/0273* (2013.01); *B60R 2021/0293* (2013.01)

(58) Field of Classification Search
CPC ... B60R 21/055; B60R 21/207; B60R 21/231; B60R 21/2334; B60R 21/26; B60R 2021/0032; B60R 2021/0273; B60R 2021/0293; B60R 2021/23146; B60R 21/23138; B60N 2/427
See application file for complete search history.

(56) References Cited

U.S. PATENT DOCUMENTS 2,873,122 A * 2/1959 Peras ...................... B60R 21/02
 297/216.12
3,083,938 A * 4/1963 Brinkworth ............ B64D 25/10
 244/141
(Continued)

FOREIGN PATENT DOCUMENTS

CN 104228623 A 12/2014
DE 10 2017 131 140 A1 6/2019

OTHER PUBLICATIONS

Chinese Office Action dated Apr. 7, 2021, for related Chinese Appln. No. 201910181970.9; 18 Pages.
(Continued)

*Primary Examiner* — Paul N Dickson
*Assistant Examiner* — Timothy Wilhelm
(74) *Attorney, Agent, or Firm* — Brooks Kushman PC

(57) ABSTRACT

A seat assembly having an occupant protection system. The occupant protection system may have a deployable shield. The deployable shield may extend around multiple sides of the seat assembly, may extend at least partially around a front of a seat occupant when deployed, may be deployable along a dynamic deployment path based on a detected position of a seat occupant, or combinations thereof.

19 Claims, 10 Drawing Sheets

Related U.S. Application Data

(60) Provisional application No. 62/641,569, filed on Mar. 12, 2018.

(51) Int. Cl.
  *B60R 21/26* (2011.01)
  *B60R 21/2334* (2011.01)
  *B60R 21/231* (2011.01)
  *B60R 21/02* (2006.01)
  *B60R 21/00* (2006.01)

(56) References Cited

U.S. PATENT DOCUMENTS

| | | | | |
|---|---|---|---|---|
| 3,218,103 A * | 11/1965 | Boyce | B64D 25/02 | 128/DIG. 20 |
| 3,623,768 A * | 11/1971 | Capener | B60N 2/757 | 280/730.2 |
| 3,692,327 A * | 9/1972 | Barrick, Sr | B60R 21/08 | 280/749 |
| 3,753,576 A * | 8/1973 | Gorman | B60R 21/232 | 297/488 |
| 3,827,716 A * | 8/1974 | Vaughn | B60R 22/14 | 24/698.2 |
| 3,837,670 A * | 9/1974 | Hilyard | B60R 21/08 | 297/488 |
| 3,929,374 A * | 12/1975 | Hogan | A47C 1/036 | 297/284.4 |
| 3,953,049 A * | 4/1976 | Surace | B60R 21/18 | 280/733 |
| 4,081,156 A * | 3/1978 | Ideskar | B64D 25/02 | 244/122 AG |
| 4,215,835 A * | 8/1980 | Wedgwood | B64D 25/02 | 244/122 AG |
| 4,359,200 A * | 11/1982 | Brevard | B64D 25/02 | 244/122 AG |
| 4,436,262 A * | 3/1984 | Cummings | B64D 25/02 | 244/122 AG |
| 4,440,443 A * | 4/1984 | Nordskog | B60N 2/882 | 297/217.4 |
| 4,508,294 A * | 4/1985 | Lorch | B64D 25/02 | 244/122 AG |
| 4,592,523 A * | 6/1986 | Herndon | B64D 25/02 | 297/216.12 |
| 4,667,902 A * | 5/1987 | Zenobi | B64D 25/02 | D12/345 |
| 4,749,153 A * | 6/1988 | Herndon | B64D 25/10 | 244/122 A |
| 5,232,243 A * | 8/1993 | Blackburn | G01G 19/4142 | 177/144 |
| 5,301,903 A * | 4/1994 | Aronne | B64D 25/02 | 244/122 AG |
| 5,415,366 A * | 5/1995 | Mastrolia | B64D 25/02 | 244/122 AG |
| 5,464,246 A * | 11/1995 | Castro | D04C 1/06 | 244/122 AG |
| 5,470,103 A * | 11/1995 | Vaillancourt | B60R 21/232 | 280/730.2 |
| 5,499,840 A * | 3/1996 | Nakano | B60N 2/68 | 280/730.2 |
| 5,785,347 A * | 7/1998 | Adolph | B60R 21/01556 | 180/273 |
| 5,806,923 A * | 9/1998 | Tschaschke | B60N 2/4249 | 297/216.13 |
| 6,018,693 A * | 1/2000 | Blackburn | B60R 21/01536 | 180/268 |
| 6,027,138 A * | 2/2000 | Tanaka | G01C 3/085 | 250/559.22 |
| 6,033,017 A * | 3/2000 | Elqadah | B60N 2/4279 | 297/216.13 |
| 6,082,817 A * | 7/2000 | Muller | B60N 2/1842 | 297/216.12 |
| 6,123,357 A * | 9/2000 | Hosoda | B60R 21/01556 | 280/730.2 |
| 6,158,812 A * | 12/2000 | Bonke | B60N 2/818 | 297/216.12 |
| 6,199,902 B1 * | 3/2001 | Cooper | B60R 21/01534 | 280/734 |
| 6,237,945 B1 * | 5/2001 | Aboud | B60R 21/18 | 280/808 |
| 6,308,917 B1 * | 10/2001 | Ruff | B64D 25/10 | 244/122 AG |
| 6,315,245 B1 * | 11/2001 | Ruff | B64D 25/02 | 244/122 AG |
| 6,393,133 B1 | 5/2002 | Breed et al. | | |
| 6,428,041 B1 * | 8/2002 | Wohllebe | B60R 21/2338 | 280/736 |
| 6,572,137 B2 * | 6/2003 | Bossecker | B60R 21/207 | 297/216.12 |
| 6,817,673 B2 * | 11/2004 | Walker | B60R 22/26 | 297/440.22 |
| 6,942,248 B2 * | 9/2005 | Breed | B60R 21/01534 | 701/45 |
| 7,040,651 B2 * | 5/2006 | Bossecker | B60R 21/23138 | 297/216.12 |
| 7,077,430 B2 * | 7/2006 | Johansson | B60R 21/08 | 280/748 |
| 7,150,468 B2 * | 12/2006 | Pan | B60R 21/207 | 280/730.1 |
| 7,207,594 B2 * | 4/2007 | Igawa | B60R 21/231 | 280/730.1 |
| 7,258,188 B2 * | 8/2007 | Chernoff | B60R 22/26 | 297/480 |
| 7,357,454 B2 * | 4/2008 | Schiener | B60N 2/99 | 297/284.9 |
| 7,380,818 B2 * | 6/2008 | Hofbeck | B60R 21/01534 | 701/45 |
| 7,445,284 B2 * | 11/2008 | Gerfast | B60N 2/42745 | 297/216.12 |
| 7,461,895 B2 * | 12/2008 | Holdampf | B60N 2/986 | 297/378.12 |
| 7,503,583 B2 * | 3/2009 | Muller | B60R 21/205 | 280/743.1 |
| 7,516,979 B2 * | 4/2009 | Kokeguchi | B60R 21/233 | 280/743.1 |
| 7,549,672 B2 * | 6/2009 | Sato | B60R 21/2338 | 280/730.2 |
| 7,604,080 B2 * | 10/2009 | Breed | B60N 2/4279 | 180/274 |
| 7,699,265 B2 * | 4/2010 | Mastrolia | B64D 25/10 | 244/122 AG |
| 7,726,733 B2 * | 6/2010 | Balser | B60N 2/4235 | 280/730.2 |
| 7,770,921 B2 * | 8/2010 | Mueller | B60R 21/2346 | 280/739 |
| 7,878,452 B2 * | 2/2011 | Mastrolia | B64D 25/10 | 244/122 AG |
| 7,922,190 B2 * | 4/2011 | Sugimoto | B60R 21/233 | 280/736 |
| 7,922,191 B2 * | 4/2011 | Choi | B60R 21/233 | 280/743.2 |
| 7,926,839 B1 * | 4/2011 | Mothaffar | B60R 22/001 | 280/733 |
| 7,942,440 B2 * | 5/2011 | Choi | B60R 21/2346 | 280/740 |
| 7,963,598 B2 * | 6/2011 | Akaike | B60N 2/865 | 297/216.12 |
| 7,967,382 B2 * | 6/2011 | Pyun | B60N 2/3011 | 297/378.1 |
| 8,087,690 B2 * | 1/2012 | Kim | B60R 21/214 | 280/729 |
| 8,235,466 B2 * | 8/2012 | Yamada | B60N 2/986 | 297/378.1 |
| 8,256,796 B2 * | 9/2012 | Loibl | B60R 21/2338 | 280/730.2 |
| 8,393,636 B2 * | 3/2013 | Tanaka | B60R 21/261 | 280/743.1 |

(56) References Cited

U.S. PATENT DOCUMENTS

| | | | |
|---|---|---|---|
| 8,398,113 B2* | 3/2013 | Choi | B60R 21/2346 280/730.1 |
| 8,485,551 B2* | 7/2013 | Dainese | B60R 21/207 280/730.2 |
| 8,579,321 B2* | 11/2013 | Lee | B60R 21/233 280/729 |
| 8,596,715 B2* | 12/2013 | Yamaguchi | B60N 2/862 297/391 |
| 8,807,593 B2* | 8/2014 | Lee | B60R 21/213 280/730.1 |
| 8,820,830 B2* | 9/2014 | Lich | B60N 2/4235 297/216.13 |
| 8,899,619 B2* | 12/2014 | Fukawatase | B60R 21/207 280/730.2 |
| 8,985,622 B1* | 3/2015 | Cannon | B60R 21/231 280/730.2 |
| 9,038,948 B2* | 5/2015 | Ruff | B64D 25/02 244/122 AG |
| 9,102,300 B2* | 8/2015 | Faruque | B60R 21/23138 |
| 9,126,508 B2* | 9/2015 | Line | B60N 2/2231 |
| 9,156,426 B1* | 10/2015 | Faruque | B60R 21/207 |
| 9,238,425 B2* | 1/2016 | Fukawatase | B60N 2/4235 |
| 9,333,931 B1* | 5/2016 | Cheng | B60R 21/02 |
| 9,352,839 B2* | 5/2016 | Gehret | B64D 11/06205 |
| 9,434,341 B2 | 9/2016 | Kaneko et al. | |
| 9,533,605 B2* | 1/2017 | Fujiwara | B60R 21/233 |
| 9,533,651 B1* | 1/2017 | Ohno | B60N 2/914 |
| 9,573,497 B2* | 2/2017 | Jaradi | B60N 2/4207 |
| 9,573,553 B2* | 2/2017 | Ko | B60R 21/13 |
| 9,707,876 B2* | 7/2017 | White | B60N 2/6027 |
| 9,744,932 B1* | 8/2017 | Faruque | B60R 21/16 |
| 9,744,933 B1 | 8/2017 | Rao et al. | |
| 9,758,127 B1* | 9/2017 | Farooq | B60R 21/18 |
| 9,783,155 B2* | 10/2017 | Kondo | B60R 22/195 |
| 9,827,876 B2* | 11/2017 | Madaras | B60R 21/04 |
| 9,919,673 B2* | 3/2018 | Ohno | B60R 21/2338 |
| 9,981,624 B2* | 5/2018 | Perlo | B60R 21/207 |
| 10,077,058 B2* | 9/2018 | Ohmi | G05D 1/0055 |
| 10,112,570 B2* | 10/2018 | Barbat | B60R 21/23138 |
| 10,189,431 B2* | 1/2019 | Yamamoto | B60R 21/237 |
| 10,189,432 B2* | 1/2019 | Matsushita | B60R 22/00 |
| 10,232,814 B2* | 3/2019 | Gandhi | B60R 21/0134 |
| 10,246,043 B2* | 4/2019 | Schneider | B60R 21/235 |
| 10,252,688 B2* | 4/2019 | Szawarski | B60N 2/002 |
| 10,328,889 B2* | 6/2019 | Sugie | B60R 21/01552 |
| 10,343,638 B2* | 7/2019 | Fukawatase | B60R 21/23138 |
| 10,471,919 B2* | 11/2019 | Faruque | B60R 21/2338 |
| 10,471,920 B2* | 11/2019 | Dry | B60R 21/2165 |
| 10,479,310 B2* | 11/2019 | Dry | B60N 2/79 |
| 10,513,206 B2* | 12/2019 | Spahn | B60N 2/4279 |
| 10,518,733 B2* | 12/2019 | Dry | B60R 21/01554 |
| 10,625,704 B2* | 4/2020 | Dry | B60N 2/14 |
| 10,632,952 B2* | 4/2020 | Markusic | B60R 21/231 |
| 10,632,958 B2* | 4/2020 | Dry | B60R 21/2338 |
| 10,633,100 B2* | 4/2020 | Adams | B64D 25/10 |
| 10,710,539 B2* | 7/2020 | Cho | B60R 21/207 |
| 10,814,818 B2* | 10/2020 | Dry | B60R 21/207 |
| 11,027,683 B1* | 6/2021 | Palazzolo | B60R 21/08 |
| 11,155,228 B2* | 10/2021 | Komarizadeh | B60R 21/0132 |
| 2002/0140214 A1* | 10/2002 | Breed | B60N 2/28 280/735 |
| 2004/0245813 A1* | 12/2004 | Steffens, Jr. | B60N 2/42781 297/216.1 |
| 2006/0043777 A1* | 3/2006 | Friedman | B60N 2/986 297/216.13 |
| 2006/0214401 A1* | 9/2006 | Hirata | B60R 21/2338 280/743.2 |
| 2007/0040368 A1* | 2/2007 | Manley | B60R 21/231 280/730.2 |
| 2007/0228709 A1* | 10/2007 | Khouri | B60R 21/233 280/743.1 |
| 2010/0213748 A1* | 8/2010 | Pedrero Iniguez | B60N 2/865 297/410 |
| 2010/0237596 A1* | 9/2010 | Sugimoto | B60R 21/26 280/743.1 |
| 2011/0254330 A1 | 10/2011 | Lich et al. | |
| 2012/0007408 A1* | 1/2012 | Freienstein | B60R 21/0134 297/464 |
| 2012/0086250 A1* | 4/2012 | Stoessel | B60N 2/99 297/284.9 |
| 2012/0089303 A1* | 4/2012 | Freienstein | B60R 21/02 701/45 |
| 2012/0235459 A1* | 9/2012 | Yetukuri | B60N 2/002 297/391 |
| 2013/0015642 A1* | 1/2013 | Islam | B60R 21/231 29/428 |
| 2013/0093224 A1* | 4/2013 | Dainese | B60R 21/207 297/216.12 |
| 2014/0042733 A1* | 2/2014 | Fukawatase | B60R 21/0136 280/730.2 |
| 2014/0259774 A1 | 9/2014 | Minden | |
| 2014/0300088 A1* | 10/2014 | Fukawatase | B60R 21/13 280/730.2 |
| 2014/0327234 A1* | 11/2014 | Heurlin | B60N 2/2884 280/730.1 |
| 2016/0082915 A1* | 3/2016 | Madaras | B60R 21/013 297/216.19 |
| 2016/0121839 A1* | 5/2016 | Ko | B60R 21/233 280/730.1 |
| 2016/0272141 A1* | 9/2016 | Ohmura | B60R 21/01554 |
| 2016/0347272 A1* | 12/2016 | Kato | B60R 21/233 |
| 2017/0028955 A1* | 2/2017 | Ohno | B60R 21/233 |
| 2017/0057456 A1* | 3/2017 | Ohno | B60R 21/231 |
| 2017/0057459 A1* | 3/2017 | Kondo | B60R 22/195 |
| 2017/0144622 A1* | 5/2017 | Perlo | B60R 21/237 |
| 2017/0203711 A1* | 7/2017 | Ohno | B60R 21/203 |
| 2017/0259704 A1* | 9/2017 | Madaras | B60R 21/207 |
| 2017/0259774 A1* | 9/2017 | Matsushita | B60R 21/207 |
| 2017/0291569 A1* | 10/2017 | Sugie | B60R 21/233 |
| 2018/0222432 A1* | 8/2018 | Schneider | B60R 21/262 |
| 2018/0354449 A1* | 12/2018 | Markusic | B60R 21/23138 |
| 2019/0016293 A1* | 1/2019 | Saso | B60R 21/264 |
| 2019/0031132 A1* | 1/2019 | Dry | B60R 21/2338 |
| 2019/0054884 A1* | 2/2019 | Dry | B60R 21/2342 |
| 2019/0071046 A1* | 3/2019 | Dry | B60R 21/233 |
| 2019/0217803 A1* | 7/2019 | Dry | B60R 21/2338 |
| 2019/0275974 A1* | 9/2019 | Yetukuri | B60R 21/231 |
| 2019/0291678 A1* | 9/2019 | Cho | B60R 21/233 |

OTHER PUBLICATIONS

Second Chinese Office Action dated Nov. 24, 2021, for related Chinese Appln. No. 201910181970.9; 6 Pages.

German Office Action dated Dec. 22, 2021, for related German Appln. No. 10 2019 203 316.4; 7 Pages.

* cited by examiner

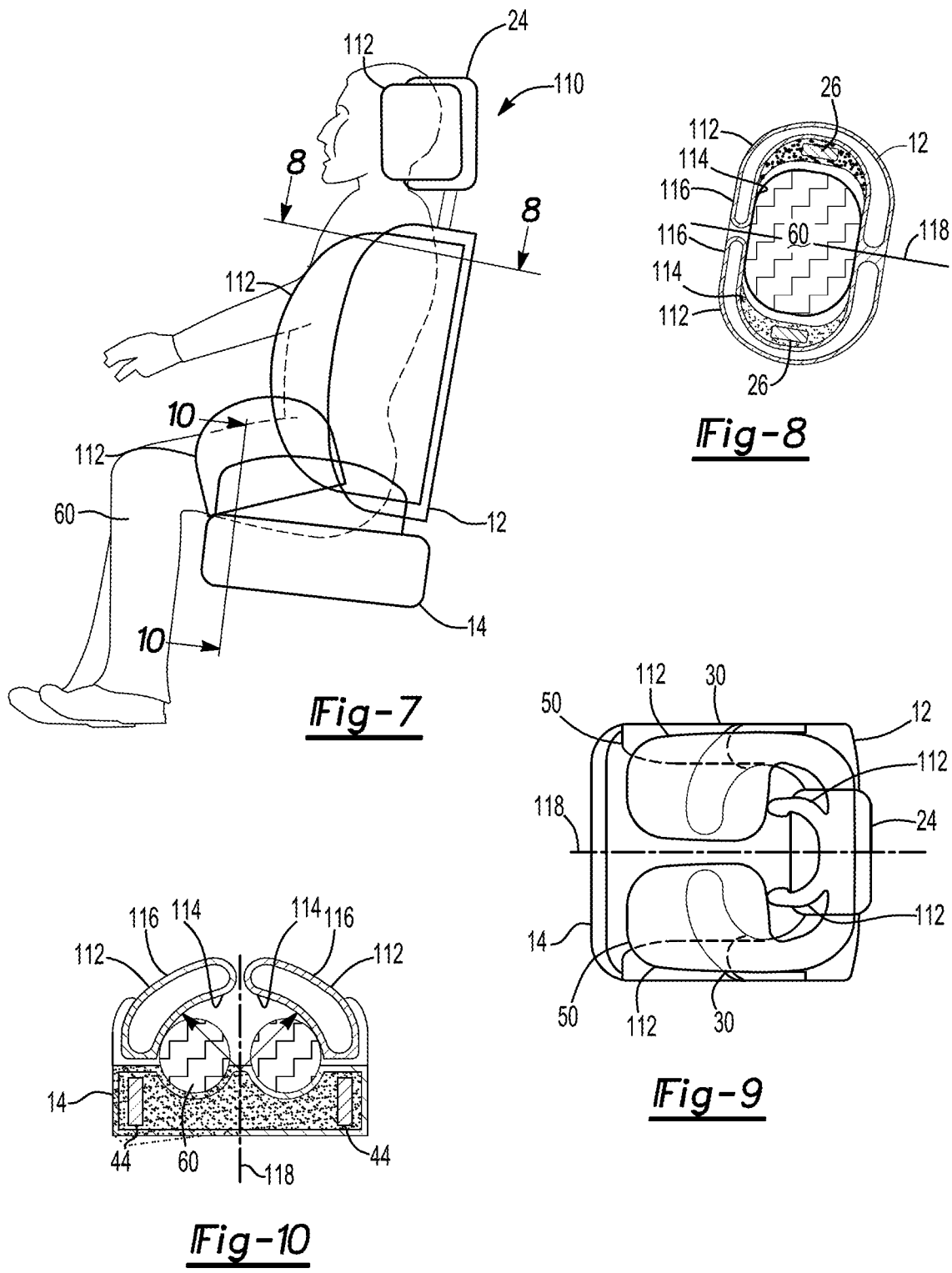

OCCUPANT PROTECTION SYSTEM FOR A VEHICLE SEAT

CROSS-REFERENCE TO RELATED APPLICATIONS

This application is a continuation of U.S. application Ser. No. 16/243,595, filed Jan. 9, 2019, which in turn claims the benefit of U.S. provisional application Ser. No. 62/641,569, filed Mar. 12, 2018, the disclosures of which are hereby incorporated in their entirety by reference herein.

TECHNICAL FIELD

This disclosure relates to occupant protection systems for a vehicle seat and associated methods of control.

BACKGROUND

A vehicular seat having a passenger restraint system is disclosed in U.S. Pat. No. 8,256,796.

SUMMARY

In at least one embodiment, a seat assembly is provided. The seat assembly may include an occupant protection system. The occupant protection system may have a deployable shield. The deployable shield may extend around one or more sides of the seat assembly.

In at least one embodiment, a seat assembly is provided. The seat assembly may include an occupant protection system. The occupant protection system may include deployable shields that are deployable from opposite sides of the seat assembly. The deployable shields may extend at least partially around a front of a seat occupant when deployed.

In at least one embodiment, a seat assembly is provided. The seat assembly may include an occupant protection system. The occupant protection system may have a deployable shield that may be deployable along a dynamic deployment path based on a detected position of a seat occupant.

BRIEF DESCRIPTION OF THE DRAWINGS

FIG. 7 is a side view of the seat assembly with deployable shields in a deployed condition.

FIG. 8 is a section view of the seat assembly of FIG. 7 along section line 8-8.

FIG. 9 is a top view of the seat assembly of FIG. 7 without the seat occupant.

FIG. 10 is a section view of the seat assembly of FIG. 7 along section line 10-10.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
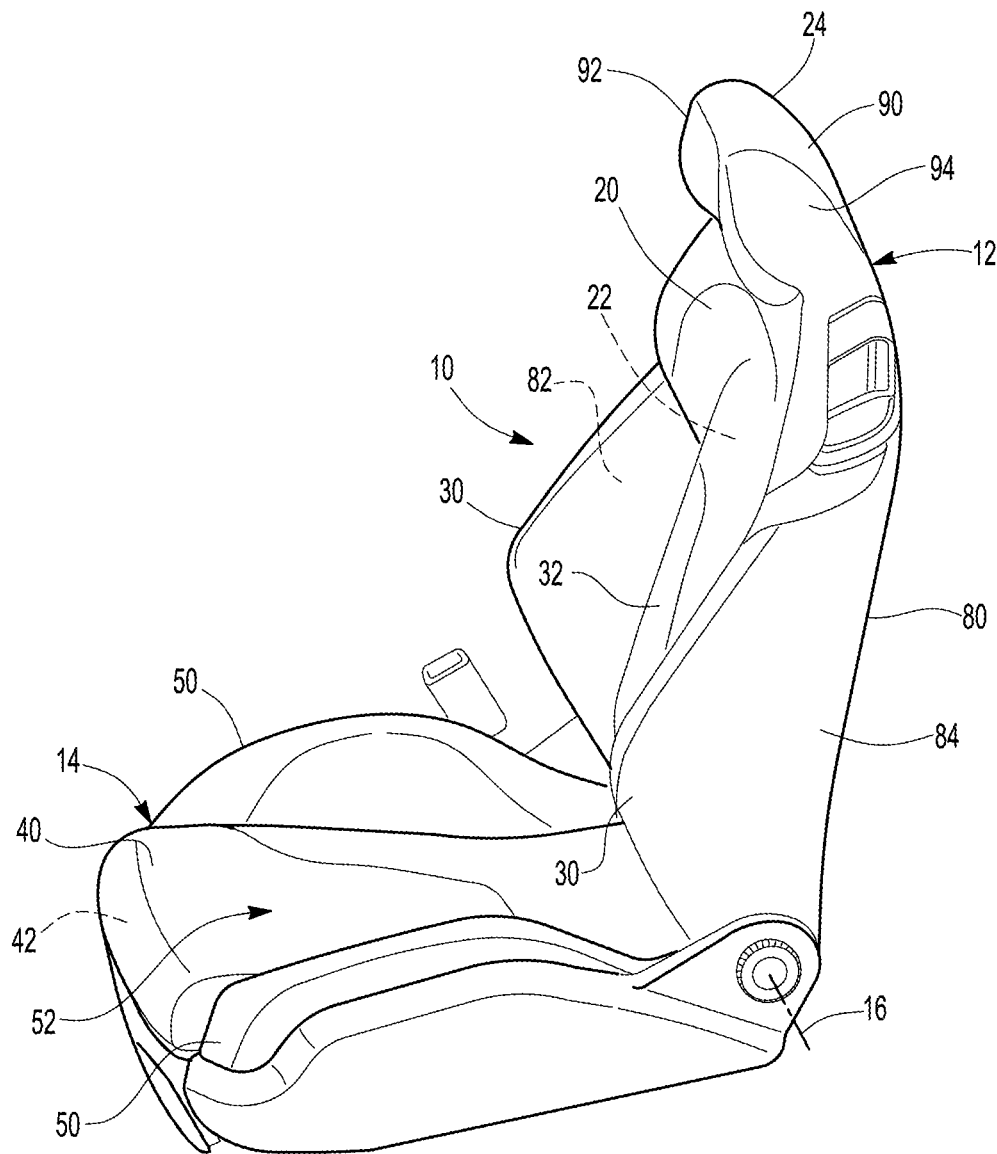
FIG. 1 is a perspective view of an example of a seat assembly.

Referring to FIG. 1, an example of a seat assembly 10 is shown. The seat assembly 10 may be configured for use in a vehicle, such as a motor vehicle like a car or truck.

It is contemplated that the seat assembly 10 may be provided in an autonomous motor vehicle. An autonomous motor vehicle may automate various functions associated with driving the vehicle, including, but not limited to steering, acceleration, deceleration and braking, parking, and collision avoidance. Depending on the level of autonomy or automation provided with the vehicle, components such as a steering wheel, acceleration pedal, brake pedal, gearshift selector, and the like may be omitted. This in turn may provide more space in the passenger compartment and may allow one or more of the seat assemblies that are provided with the vehicle to be arranged in nonstandard arrangements. For instance, one or more seat assemblies may be oriented in positions or may be moveable to positions in which the seat assembly is not oriented along a longitudinal axis or front-to-rear axis of the vehicle and seat assembly and/or a seat occupant does not face toward the front or rear of the vehicle. As a result, occupant protection systems are needed to help protect seat occupants when a seat assembly is in a nonstandard position or is movable to various nonstandard positions. Furthermore, occupant protection systems are needed that may accommodate seat occupants that may be misaligned with the seat assembly or that may be leaning or oriented in an offset manner from the seating regions of the seat assembly 10.

Various occupant protection systems will be discussed below that may be provided with vehicles having varying levels of autonomous capabilities or that may be provided with vehicles that do not have such autonomous capabilities.

Referring to FIG. 1, the seat assembly 10 may include a seat back 12 and a seat bottom 14.

Figure 14:
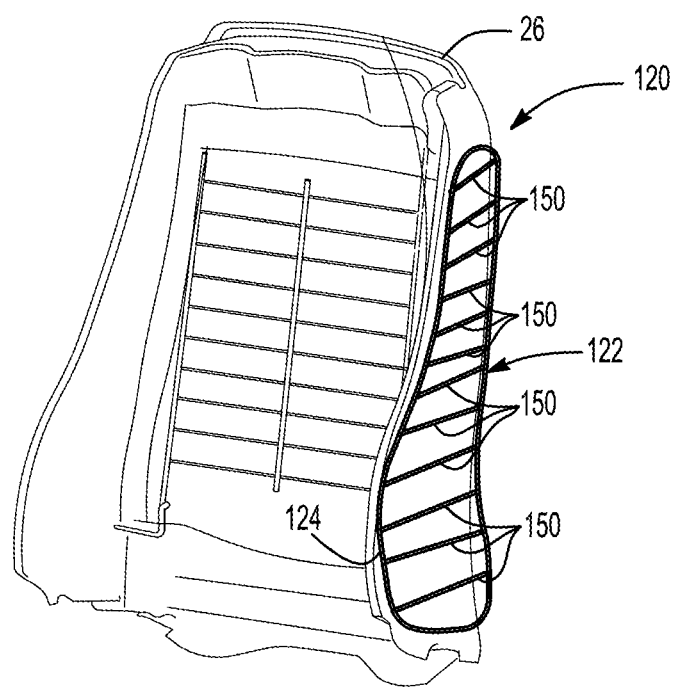
FIG. 14 is a perspective view of a portion of a seat back having a dynamically deployable shield in a pre-deployment position.

The seat back 12 may be configured to support the back of a seat occupant. The seat back 12 may be pivotal about an axis 16 with respect to the seat bottom 14. For example, one or more recliner mechanisms may pivotally connect the seat back 12 to the seat bottom 14. In at least one configuration, the seat back 12 may include a seat back trim cover 20, a seat back cushion 22, a head restraint 24, and a seat back frame 26, an example of which is best shown in FIG. 14.

The seat back trim cover 20 may be disposed over or upon the seat back cushion 22 and may form or provide at least a portion of a visible exterior surface of the seat back 12. The seat back trim cover 20 may include a plurality of trim panels that may be assembled in any suitable manner, such as by stitching. In addition, the seat back trim cover 20 may be made of any suitable material or materials, such as fabric, leather, vinyl, carpet, or combinations thereof. The seat back trim cover 20 may be secured to the seat back frame 26 with one or more retention features, such as a trim clip, hog ring, hook and loop fastener like as Velcro®, or the like. In at least one configuration, the seat back trim cover 20 may include one or more deployment seams that may sever to permit deployment of an occupant protection device from inside the seat back 12 or under the seat back trim cover 20 as will be discussed in more detail below.

The seat back cushion 22 may be at least partially concealed by the seat back trim cover 20 and may be directly or indirectly supported by the seat back frame 26. The seat back cushion 22 may be made of any suitable material, such as foam. The seat back cushion 22 may include or help define a pair of side bolsters 30 and a center seating region 32.

The side bolsters 30 may generally extend along opposing lateral sides of the seat back 12 and may extend between the top side and bottom side of the seat back cushion 22. As such, the side bolsters 30 may be disposed along opposite sides of the center seating region 32 and may extend outwardly or forwardly from the center seating region 32 toward a seat occupant.

The center seating region 32 may be configured to support the back of a seat occupant. The center seating region 32 may be disposed between the side bolsters 30 and may extend between the top and bottom of the seat back 12, the seat back cushion 22, or both.

The head restraint 24 may be disposed at the top of the seat back 12. The head restraint 24 may be adjustably positionable with respect to the seat back frame 26 and may be configured to support the head of a seat occupant. The head restraint 24 may include a cushion that may be at least partially concealed by a trim cover.

Referring to FIG. 14, the seat back frame 26 may provide structural support for the seat back 12 and may facilitate mounting of various components to the seat back 12. The seat back frame 26 may be made of any suitable material. For example, the seat back frame 26 may be made of a polymeric material, metal, fiber reinforced material, or combinations thereof. The seat back frame 26 may be at least partially disposed under the seat back trim cover 20, seat back cushion 22, or both. In at least one configuration, the seat back frame 26 may include a pair of side members that may be extend along or be arranged along opposing lateral sides or left and right sides of the seat back 12 and one or more cross members that may interconnect and extend between the side members.

Figure 5:
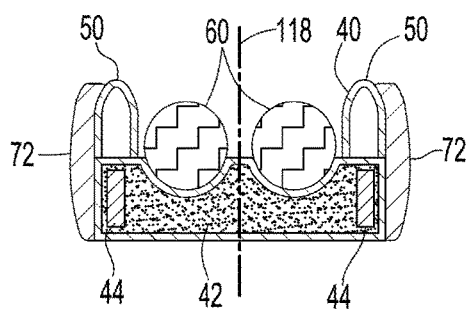
FIG. 5 is a section view of the seat assembly of FIG. 2 along section line 5-5.

Referring to FIG. 1, the seat bottom 14 may be configured to support a seat occupant. In a vehicular application, the seat bottom 14 may be mounted to a support surface, such as a vehicle floor. In at least one configuration, the seat bottom 14 may include seat bottom trim cover 40, a seat bottom cushion 42, and a seat bottom frame 44, an example of which is shown in FIG. 5.

The seat bottom trim cover 40 may be disposed over or upon the seat bottom cushion 42 and may form or provide at least a portion of a visible exterior surface of the seat bottom 14. Moreover, a seat occupant may be disposed on the seat bottom trim cover 40 when in a seated position. The seat bottom trim cover 40 may include a plurality of trim panels that may be assembled in any suitable manner, such as by stitching. In addition, the seat bottom trim cover 40 may be made of any suitable material or materials, such as fabric, leather, vinyl, carpet, or combinations thereof. The seat bottom trim cover 40 may be secured to the seat bottom frame with one or more retention features, such as a trim clip, hog ring, hook and loop fastener like as Velcro®, or the like.

The seat bottom cushion 42 may be at least partially concealed by the seat bottom trim cover 40 and may be directly or indirectly supported by the seat bottom frame 44. The seat bottom cushion 42 may be made of any suitable material, such as foam. In addition, the seat bottom cushion 42 may include or help define a pair of side bolsters 50 and a center seating region 52.

The side bolsters 50 may generally extend along opposing lateral sides of the seat bottom 14 and may extend between the front side and back side of the seat bottom cushion 42. As such, the side bolsters 50 may be disposed along opposite sides of the center seating region 52 and may extend upward from the center seating region 52 toward a seat occupant.

The center seating region 52 may be configured to support the posterior and thighs of a seat occupant. The center seating region 52 may be disposed between the side bolsters 50 and may extend between the front and back of the seat bottom cushion 42.

The seat bottom frame 44 may provide structural support for the seat bottom 14 and may facilitate mounting of various components to the seat bottom 14. The seat bottom frame 44 may be made of any suitable material. For example, the seat bottom frame 44 may be made of a polymeric material, metal, fiber reinforced material, or combinations thereof. The seat bottom frame 44 may be at least partially disposed under the seat bottom trim cover 40, seat bottom cushion 42, or both.

Figure 2:
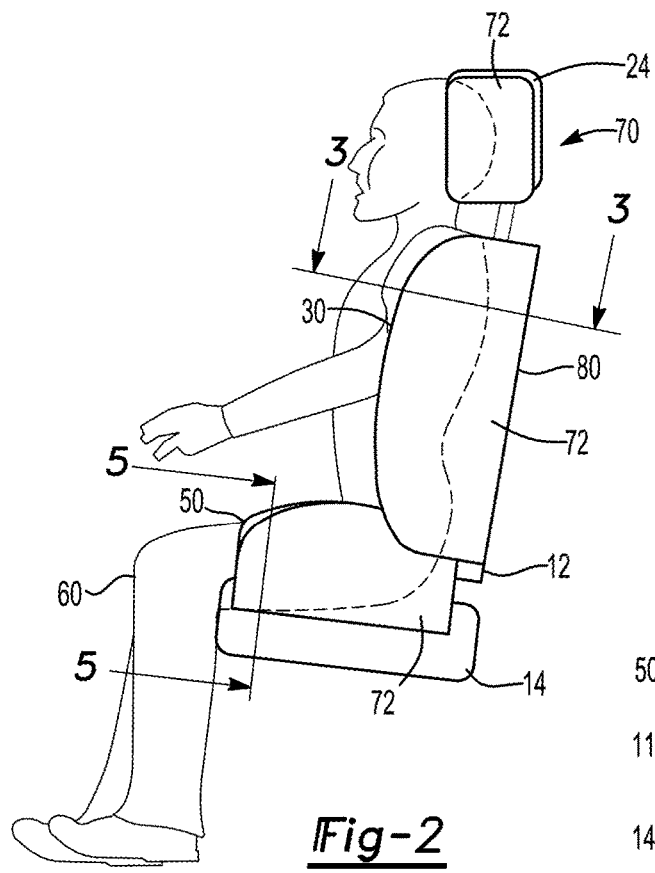
FIG. 2 is a side view of the seat assembly with a seat occupant in a seated position and deployable shields for impact absorption in a stowed condition.
Figure 3:
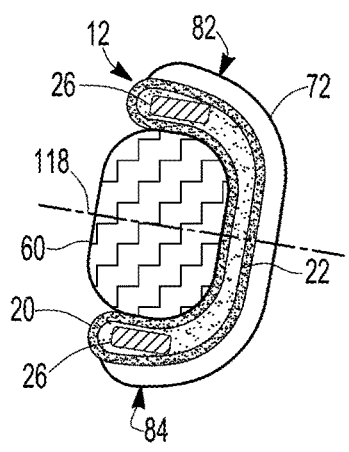
FIG. 3 is a section view of the seat assembly of FIG. 2 along section line 3-3.
Figure 4:
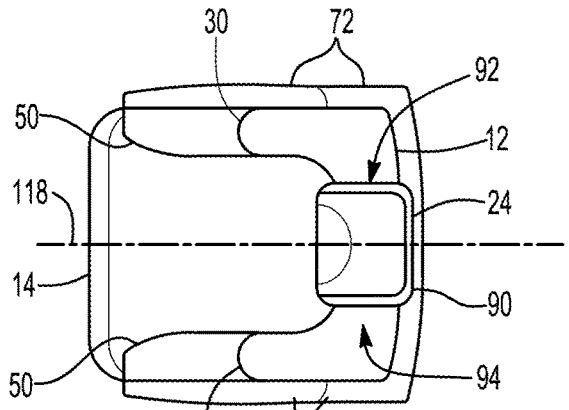
FIG. 4 is a top view of the seat assembly of FIG. 2 without the seat occupant.

Referring to FIG. 2, a simplified side view of the seat assembly 10 is shown. The simplified side view shows representative locations of the seat back 12, seat bottom 14, and the head restraint 24. In addition, the simplified side view shows an example of a seat occupant 60 in a seated position.

Referring to FIGS. 2-5, the seat assembly 10 is shown with an example of an occupant protection system 70. The occupant protection system 70 may be deployed to help prevent injury to the seat occupant 60. In the configuration shown, the occupant protection system 70 may include one or more deployable shields 72. A deployable shield 72, which may also be called an absorption shield, may absorb energy associated with a vehicle impact event. A deployable shield 72 may be provided with the seat back 12, the seat bottom 14, the head restraint 24, or combinations thereof. For example, deployable shields 72 may be provided along opposing lateral sides (e.g., left and right sides) of the seat back 12, the seat bottom 14, the head restraint 24, or combinations thereof. In addition, one or more deployable shields 72 may be provided along the back side (e.g., side that may face away from the seat occupant 60 or that may be disposed behind a seat occupant 60) of the seat back 12, the seat bottom 14, the head restraint 24, or combinations thereof. It is contemplated that a single deployable shield 72 may wrap around a portion of the seat back 12, the seat bottom 14, or the head restraint 24 from one lateral side, then behind the seat occupant 60, and over to the other lateral side. Alternatively, it is also contemplated that multiple deployable shields 72 may be employed to provide a similar arrangement.

A deployable shield 72 may be positioned in various locations with respect to components of the seat assembly 10. For example, a deployable shield 72 may be disposed under the seat back trim cover 20 when provided with the seat back 12. As such, the deployable shield 72 may be disposed between the seat back trim cover 20 and the seat back frame 26. Such positioning may include providing a deployable shield 72 between the seat back trim cover 20 and the seat back cushion 22, between the seat back cushion 22 and the seat back frame 26, or providing a deployable shield 72 that is at least partially disposed in the seat back cushion 22. It is further contemplated that a deployable shield 72 may be disposed on an exterior surface of the seat back trim cover 20 or may be disposed under the bottom of the seat back 12, such as under a map pocket that may be provided with the seat back 12. It is further contemplated that the deployable shield 72 may be provided inside a pocket, such as a map pocket or other pocket or area that may be provided with the seat back 12. In addition, one or more deployable shields 72 may be provided along the back side 80 (e.g., side that may face away from the seat occupant 60 or that may be disposed behind a seat occupant 60) of the seat back 12 and first and second lateral sides 82, 84 (e.g., left and right sides of the seat back 12 that may be disposed opposite each other).

A deployable shield 72 that is provided with a head restraint 24 may be disposed under a trim cover of the head restraint 24 such as between the head restraint trim cover and the frame or support structure of the head restraint 24. Such positioning may include providing a deployable shield 72 between the head restraint trim cover and a head restraint cushion, between the head restraint cushion and the head restraint frame, or providing a deployable shield 72 that is at least partially disposed inside the head restraint cushion. It is further contemplated that a deployable shield 72 may be disposed on an exterior surface of the head restraint trim cover, may be disposed under the head restraint 24, or may be provided in a pocket that may be provided with the head restraint 24. In addition, one or more deployable shields 72 may be provided along the back side 90 (e.g., side that may face away from the seat occupant 60 or that may be disposed behind a seat occupant 60) of the head restraint 24 and first and second lateral sides 92, 94 (e.g., left and right sides of the head restraint 24 that may be disposed opposite each other).

A deployable shield 72 may be disposed under the seat bottom trim cover 40 when provided with the seat bottom 14. As such, the deployable shield 72 may be disposed between the seat bottom trim cover 40 and the seat bottom frame 44. Such positioning may include providing a deployable shield 72 between the seat bottom trim cover 40 and the seat bottom cushion 42, between the seat bottom cushion 42 and the seat bottom frame 44, or providing a deployable shield 72 that is at least partially disposed in the seat bottom cushion 42. It is further contemplated that a deployable shield 72 may be disposed on an exterior surface of the seat bottom trim cover 40 or may be disposed under the bottom of the seat bottom 14 and may be deployable in an upward direction. It is further contemplated that the deployable shield 72 may be provided inside a pocket, such as a map pocket or similar area that may be provided with the seat bottom 14. In addition, one or more deployable shields 72 may be provided along the front side, back side, first and second lateral sides of the seat bottom, or combinations thereof.

The deployable shield 72 may have any suitable configuration. For instance, the deployable shield 72 may be configured as any material or assembly of different materials that may absorb energy in response to an impact. As one example, and deployable shield 72 may be made of a passive material, such as a viscoelastic foam that may be soft or pliable when not under sufficient pressure and that may increase in hardness, viscosity, or density in response to being rapidly compressed. Thus, providing such a material or materials under or along trim cover surfaces that face away from the seat occupant 60 may help provide a shell that may absorb energy and may harden in response to an impact to help protect the seat occupant 60, the seat structure or frame, or both. Providing such a material or materials under or along trim cover surfaces that face toward the seat occupant 60 may also help provide a shell that may absorb energy and may harden in response to an impact to help protect a seat occupant 60. A passive material may be made of a polymeric material and may be selected of configured such that the material may remain soft and pliable at lower pressures that may be less than pressures exerted during a vehicle impact event. For example, the material may remain soft and pliable at pressures that are associated with the force exerted by a seat occupant when sitting on the seat assembly 10, moving on the seat assembly 10, or removing oneself from the seat assembly 10 in the absence of a vehicle impact event or similar load forces.

Figure 6:
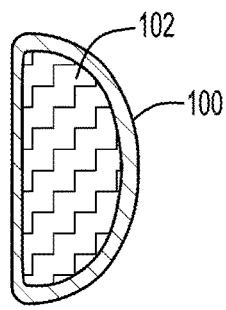
FIG. 6 illustrated a portion of a configuration of a deployable shield having an air impermeable bag that receives a filler material.
Figure 11:
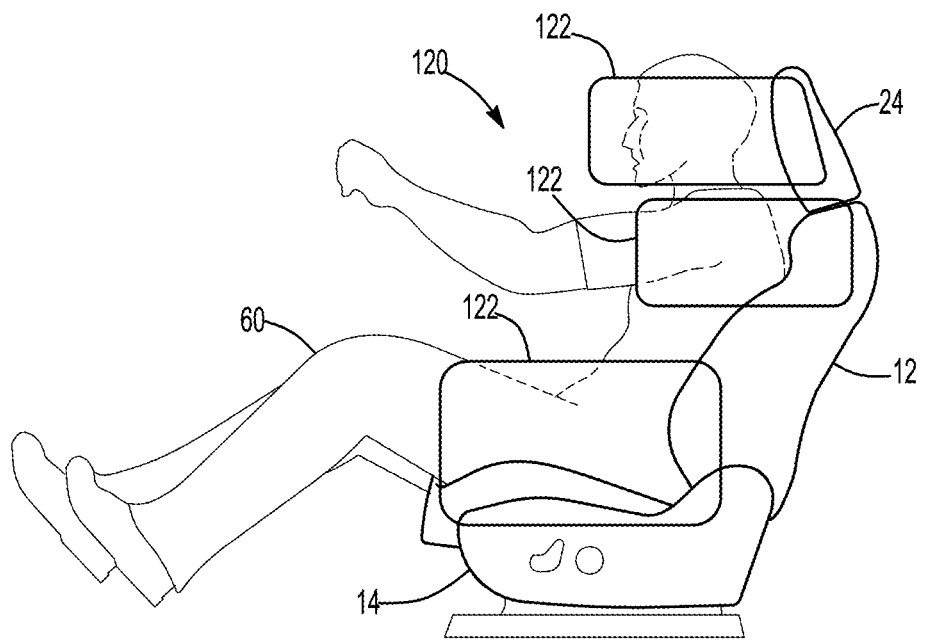
FIG. 11 is a side view of another example of a seat assembly with a seat occupant in a seated position and dynamically deployable shields.
Figure 12:
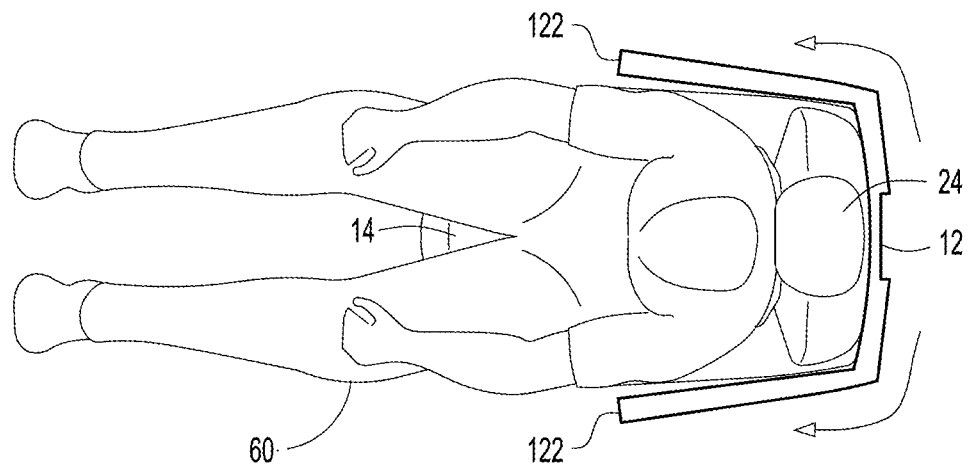
FIG. 12 is a top view of the seat assembly and the seat occupant of FIG. 11.
Figure 13:
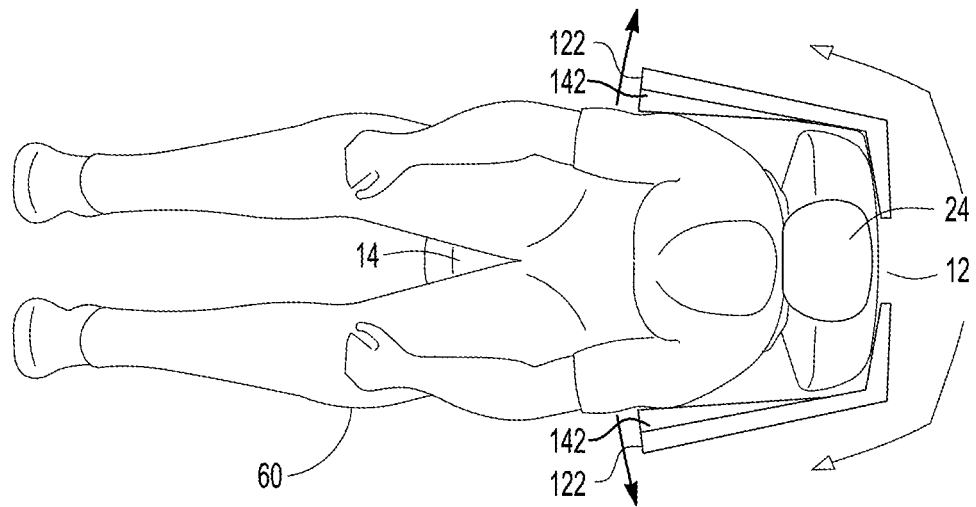
FIG. 13 is a top view of the seat assembly and occupant of FIG. 12 illustrating movement of a dynamically deployable shield with respect to FIG. 12.

Referring to FIG. 6, the deployable shield 72 may also be configured to use a fluid, such as a gas like air, to help protect a seat occupant 60. For instance, the deployable shield 72 may include an air impermeable bag 100 that may be selectively inflated or deflated in response to a vehicle impact event or in anticipation of a vehicle impact event. The air impermeable bag 100 may be partially filled with a foam or a mesh or mesh weave material, which may be collectively referred to as a filler material or a mesh material 102, that may have a plurality of voids or an open cell configuration that may permit gas to flow into or through the material. Pressurized gas may be selectively provided to the air impermeable bag to 100 inflate the deployable shield 72 and allow gas to flow into the material. For instance, the air impermeable bag 100 may be inflated in response to a vehicle impact event or in anticipation of a vehicle impact event or may be inflated as a default condition. The air impermeable bag 100 may deflate in response to impact forces exerted on the deployable shield 72. As such, the deflation of the air impermeable bag 100 and the mesh material 102 in the air impermeable bag 100 may help absorb impact forces exerted on the seat assembly 10 to help protect the seat occupant 60. Pressurized gas may be provided by a pressurized gas source, such as an inflator or tank that may hold or provide a volume of pressurized gas. Deflation of the air impermeable bag 100 may be controlled by a valve that may be actively or passively controlled. For instance, a passive valve may open automatically when sufficient pressure is exerted on the air impermeable bag 100, thereby allowing pressurized gas to exit the air impermeable bag 100 through the valve. Such a valve may be located in any suitable location, such as on the air impermeable bag 100 or with a conduit that fluidly connects the air impermeable bag 100 to the pressurized gas source.

The deployable shield 72 may rotate or move together with the seat assembly 10 and may thereby help protect a seat occupant 60 when the seat assembly 10 is in various orientations or seating positions and may allow the occupant protection system 70 to be located close to a seat occupant 60 at various orientations or seating positions. Such benefits may not be realized with airbags or other safety measures that may be mounted to other portions of the vehicle, such as the doors, instrument panel, headliner, or side pillars.

Referring to FIGS. 7-10, the seat assembly 10 is shown with another example of an occupant protection system 110. The occupant protection system 110 may be deployed to help prevent injury to the seat occupant 60. In the configuration shown, the occupant protection system 110 may include one or more deployable shields 112. A deployable shield 112 may absorb energy associated with a vehicle impact event. A deployable shield 112 may be provided with the seat back 12, the seat bottom 14, the head restraint 24, or combinations thereof. For example, one or more deployable shields 112 may be provided along opposing lateral sides (e.g., left and right sides) of the seat back 12, the seat bottom 14, the head restraint 24, or combinations thereof. In addition, one or more deployable shields 112 may be provided along the back side (e.g., side that may face away from the seat occupant 60 or that may be disposed behind a seat occupant 60) of the seat back 12, the seat bottom 14, the head restraint 24, or combinations thereof. It is contemplated that a single deployable shield 112 may wrap around a portion of the seat back 12, the seat bottom 14, or the head restraint 24 from one lateral side, then behind the seat occupant 60, and to the other lateral side. Alternatively, it is also contemplated that multiple deployable shields 112 may be employed to provide a similar arrangement.

A deployable shield 112 may be positioned in various locations with respect to components of the seat assembly 10. For example, a deployable shield 112 may be disposed under the seat back trim cover 20 when provided with the seat back 12. As such, the deployable shield 112 may be disposed between the seat back trim cover 20 and the seat back frame 26. Such positioning may include providing a deployable shield 112 between the seat back trim cover 20 and the seat back cushion 22, between the seat back cushion 22 and the seat back frame 26, or providing a deployable shield 112 that is at least partially disposed in the seat back cushion 22. It is further contemplated that a deployable shield 112 may be disposed on an exterior surface of the seat back trim cover 20 or may be disposed under the bottom of the seat back 12 such as under a map pocket that may be provided with the seat back 12. It is further contemplated that the deployable shield 112 may be provided inside a pocket, such as a map pocket or similar area that may be provided with the seat back 12. In the configuration shown, two deployable shields 112 are provided that may deploy from the side bolsters or lateral sides of the seat back 12 toward the front of the seat assembly 10 and partially around the torso and arms of the seat occupant 60. The free ends of the deployable shields 112 may be disposed in close proximity and may contact each other in front of the seat occupant 60 when inflated.

A deployable shield 112 that is provided with a head restraint 24 may be disposed under a trim cover of the head restraint, such as between the head restraint trim cover and the frame or support structure of the head restraint 24. Such positioning may include providing a deployable shield 112 between the head restraint trim cover and a head restraint cushion, between the head restraint cushion and the head restraint frame, or providing a deployable shield 112 that is at least partially disposed in the head restraint cushion. It is further contemplated that a deployable shield 112 may be disposed on an exterior surface of the head restraint trim cover, may be disposed under the head restraint 24, or may be provided in a pocket that may be provided with the head restraint 24. In the configuration shown, two deployable shields 112 are provided that may deploy from the lateral sides of the head restraint 24 toward the front of the seat assembly 10 and partially around the head and optionally the neck of the seat occupant 60. The free ends of the deployable shields 112 may be disposed in close proximity and may contact each other in front of the seat occupant 60 when inflated.

A deployable shield 112 may be disposed under the seat bottom trim cover 40 when provided with the seat bottom 14. As such, the deployable shield 112 may be disposed between the seat bottom trim cover 40 and the seat bottom frame 44. Such positioning may include providing a deployable shield 112 between the seat bottom trim cover 40 and the seat bottom cushion 42, between the seat bottom cushion 42 and the seat bottom frame 44, or providing a deployable shield 112 that is at least partially disposed in the seat bottom cushion 42. It is further contemplated that a deployable shield 112 may be disposed on an exterior surface of the seat bottom trim cover 40 or may be disposed under the bottom of the seat bottom 14 and may be deployable in an upward direction. It is further contemplated that the deployable shield 112 may be provided inside a pocket, such as a map pocket or similar area that may be provided with the seat bottom 14. In the configuration shown, two deployable shields 112 are provided that may deploy from the lateral sides of the seat bottom 14 in an upward direction and partially around the legs or thighs of the seat occupant 60. The free ends of the deployable shields 112 may be disposed in close proximity and may contact each other in front of the seat occupant 60 when inflated. It is also contemplated that one or more deployable shields 112 may deploy from the front side of the seat bottom 14 such that the deployable shields 112 may extend along or may extend around the legs of the seat occupant 60 when inflated. The free ends of such deployable shields 112 may optionally be disposed in close proximity and may contact each other in front of the seat occupant 60 when inflated.

The deployable shield 112 may have any suitable configuration. For instance, the deployable shield 112 may be configured as an airbag or may have a similar configuration to an airbag. As an example, a deployable shield 112 may be made of a flexible material that may include one or more layers and may be made of a woven material or a polymeric material such as Nylon®. The deployable shield 112 may also be configured to use a fluid, such as a gas like air, to help protect a seat occupant 60. For instance, the deployable shield 112 may be an air impermeable bag that may be selectively inflated or deflated in response to a vehicle impact event or in anticipation of a vehicle impact event. Pressurized gas may be selectively provided to the air impermeable bag to inflate the deployable shield 112. For instance, the deployable shield 112 may be inflated in response to a vehicle impact event or in anticipation of a vehicle impact event or may be inflated as a default condition. The deployable shield 112 may be inflated to a pressure such as around 3 bar (300 kPa) that may result in the deployable shield 112 becoming substantially hard to the touch or difficult to deflect or deform. The deployable shield 112 may be held in place at a mounting location and may be further secured with a tube or conduit that may provide pressurized gas. Moreover, the deployable shield 112 may be mounted in a manner that may withstand load forces to help confine or hold the seat occupant 60 in the seat assembly 10. Accordingly, the deployable shield 112 may push against the seat occupant 60 to help keep the seat occupant 60 in a seated position.

One or more deployable shields 112 may be configured to at least partially extend around the seat occupant 60 when inflated. For instance, a deployable shield 112 may be provided with a greater length of material along a first side 114 that faces away from the seat occupant 60 as compared to an opposing second side 116 that may face toward the seat occupant 60. As such, the side of the deployable shield 112 having a shorter length may inhibit the deployable shield 112 from expanding in a linear direction while the greater length of the outer side may extend along a curve or arc and may allow the deployable shield 112 to deploy or extend along a curve or arc. As such, the deployable shield 112 may deploy toward a center plane 118 of the seat assembly 10 that may bisect the seat back 12 and the seat bottom 14 or may bisect a seating position upon which the seat occupant 60 is disposed. Such a plane may be a vertical plane that may be disposed substantially perpendicular to a support surface upon which the seat assembly 10 may be disposed. Thus, the deployable shield 112 may at least partially wrap around and may embrace a front side of a seat occupant 60 when inflated, which may help protect the seat occupant 60 and may help position the seat occupant 60 and hold the seat occupant 60 in the seat assembly 10. The curve or arc along which the deployable shield 112 may be deployed or along which the deployable shield 112 may extend along may have a constant radius or substantially constant radius in one or more configurations, notwithstanding potential deformation from a seat occupant or deformation of vehicle components.

The deployable shield 112 may deflate in response to impact forces exerted on the deployable shield 112 or the seat assembly 10. As such, the deflation of the deployable shield 112 may help absorb impact forces exerted on the seat assembly 10 to help protect the seat occupant 60. Deflation of the deployable shield 112 may be controlled by a valve that may be actively or passively controlled. For instance, a passive valve may open automatically when sufficient pressure is exerted on the deployable shield 112, thereby allowing pressurized gas to exit the deployable shield 112 through the valve. Such a valve may be configured not to open when pressures less than those associated with a vehicle impact event are exerted upon the deployable shield 112. The deployable shield 112 may also be automatically deflated during and/or after the impact event to reduce pressure on the seat occupant 60, such as by actively opening one or more valves, thereby reducing constraining forces exerted on the seat occupant 60 by the deployable shield 112 to permit the seat occupant 60 exit the seat assembly 10 without interference by an inflated deployable shield 112 and to reduce or eliminate blocking of the vision or eyes of a seat occupant 60 to provide improved visibility after a vehicle impact event.

The deployable shield 112 may rotate or move together with the seat assembly 10 and may thereby help protect a seat occupant 60 when the seat assembly 10 is in various orientations or seating positions and may allow the occupant protection system 110 to be located close to a seat occupant 60 at various orientations or seating positions. Such benefits may not be realized with airbags or other safety measures that may be mounted to other portions of the vehicle, such as the doors, instrument panel, headliner, or side pillars.

Referring to FIGS. 11-21, the seat assembly 10 is shown with another example of an occupant protection system 120. The occupant protection system 120 may be deployed to help prevent injury to the seat occupant 60. In the configuration shown, the occupant protection system 120 may include one or more deployable shields 122. A deployable shield 122, which may also be called a dynamic shield, may absorb energy associated with a vehicle impact event, may help position the seat occupant 60, may help protect a seat occupant 60, or combinations thereof.

A deployable shield 122 may be provided with the seat back 12, the seat bottom 14, the head restraint 24, or combinations thereof. For example, one or more deployable shields 122 may be provided along opposing lateral sides (e.g., left and right sides) of the seat back 12, the seat bottom 14, the head restraint 24, or combinations thereof. In addition, one or more deployable shields 122 may be stowed inside the seat back 12, the seat bottom 14, the head restraint 24, or combinations thereof prior to deployment.

A deployable shield 122 may be positioned in various locations with respect to components of the seat assembly 10. For example, a deployable shield 122 may be disposed under the seat back trim cover 20 prior to deployment when provided with the seat back 12. As such, the deployable shield 122 may be disposed between the seat back trim cover 20 and the seat back frame 26. Such positioning may include providing a deployable shield 122 between the seat back trim cover 20 and the seat back cushion 22, between the seat back cushion 22 and the seat back frame 26, or providing a deployable shield 122 that is at least partially disposed in the seat back cushion 22. It is further contemplated that a deployable shield 122 may be disposed on an exterior surface of the seat back trim cover 20 or may be disposed under the bottom of the seat back 12, such as under a map pocket that may be provided with the seat back 12. It is also contemplated that the deployable shield 122 may be provided inside a pocket, such as a map pocket or similar area that may be provided with the seat back 12. In the configuration shown in FIGS. 11-21, two deployable shields 122 are provided that may deploy from the side bolsters 50 or lateral sides of the seat back 12 toward the front of the seat assembly 10, such as adjacent to the torso and arms of the seat occupant 60, when deployed.

A deployable shield 122 that is provided with a head restraint 24 may be disposed under a trim cover of the head restraint, such as between the head restraint trim cover and the frame or support structure of the head restraint 24. Such positioning may include providing a deployable shield 122 between the head restraint trim cover and a head restraint cushion, between the head restraint cushion and the head restraint frame, or providing a deployable shield 122 that is at least partially disposed in the head restraint cushion. It is further contemplated that a deployable shield 122 may be disposed on an exterior surface of the head restraint trim cover, may be disposed under the head restraint 24, or may be provided in a pocket that may be provided with the head restraint 24. In the configuration shown, two deployable shields 122 are provided that may deploy from the lateral sides of the head restraint 24 toward the front of the seat assembly 10 and may be disposed adjacent to the head and optionally the neck of the seat occupant 60 when deployed.

A deployable shield 122 may be disposed under the seat bottom trim cover 40 when provided with the seat bottom 14. As such, the deployable shield 122 may be disposed between the seat bottom trim cover 40 and the seat bottom frame 44. Such positioning may include providing a deployable shield 122 between the seat bottom trim cover 40 and the seat bottom cushion 42, between the seat bottom cushion 42 and the seat bottom frame 44, or providing a deployable shield 122 that is at least partially disposed in the seat bottom cushion 42. It is further contemplated that a deployable shield 122 may be disposed on an exterior surface of the seat bottom trim cover 40 or may be disposed under the bottom of the seat bottom 14 and may be deployable in an upward direction. It is further contemplated that the deployable shield 122 may be provided inside a pocket, such as a map pocket or similar area that may be provided with the seat bottom 14. In the configuration shown, two deployable shields 122 are provided that may deploy from the lateral sides of the seat bottom 14 in an upward direction and may deploy adjacent to the legs or thighs of the seat occupant 60. It is also contemplated that one or more deployable shield 122 may deploy from the front side of the seat bottom 14 such that the deployable shield 122 may be disposed adjacent to the lower legs of the seat occupant 60 when deployed.

The deployable shield 122 may have any suitable configuration. For instance, the deployable shield 122 may be configured as an airbag or may have a similar configuration to an airbag. In such a configuration, the deployable shield 122 may also be configured to use a fluid, such as a gas like air, to help protect a seat occupant 60. For instance, the deployable shield 122 may be selectively inflated or deflated in response to a vehicle impact event or in anticipation of a vehicle impact event. Pressurized gas may be selectively provided to the air impermeable bag to inflate the deployable shield 122. For instance, the deployable shield 122 may be inflated to deploy the deployable shield 122 and eject a portion of the deployable shield 122 from the seat assembly 10.

Referring to FIGS. 14-17, a deployable shield 122 having a noninflatable configuration is shown. In this configuration, the deployable shield 122 may include a shield frame 124, an optional shield cover 126, one or more guide members 128, and a shield actuator 130.

The shield frame 124 may include a plurality of frame members 150. The frame members 150 may be made of any suitable material, such as a polymeric material or a metal alloy. It is also contemplated that the shield frame 124 may include or may be made of a material that has shape memory (e.g., a material that has one configuration in the absence of a triggering attribute like electric current, thermal energy, etc., that alters the shape of the material and that assumes a second shape or memorized shape when the triggering attribute is provided). The frame members 150 may be fixedly coupled to each other. For instance, the frame members 150 may define a perimeter of the shield frame 124 and may include a plurality of cross members that may extend between frame members 150 that define the perimeter of the shield frame 124. As one example, the cross members may extend in a forward/backward direction. The shield frame 124 may be disposed along a lateral side of the seat back 12, the seat bottom 14, the head restraint 24, or combinations thereof when in a stowed position. It is also contemplated that the shield frame 124 may be provided as a structural plate and may optionally support or be at least partially covered in foam or another energy absorbing material.

Figure 18:
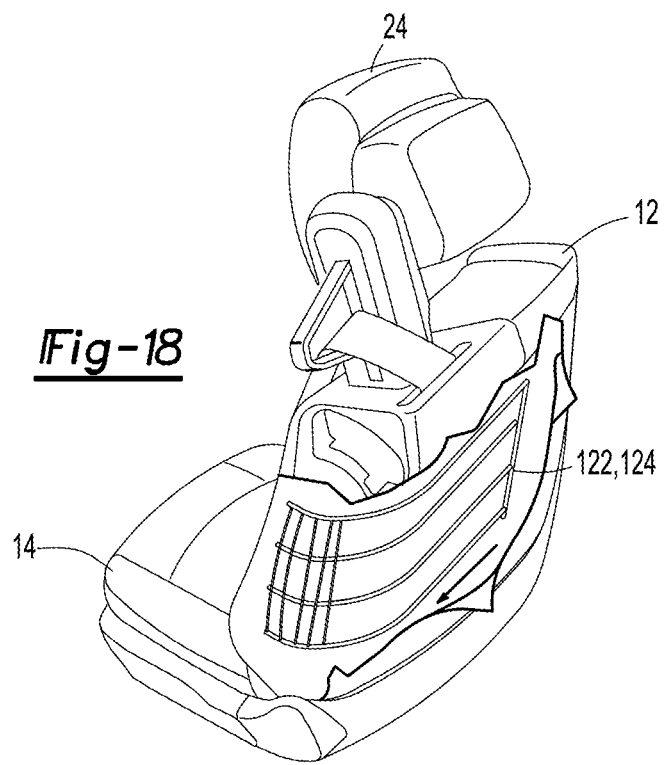
FIG. 18 is a perspective view of an example of a vehicle seat having a dynamically deployable shield in a stowed or pre-deployment position.

In addition, it is contemplated that the shield frame 124 may be flexible and may wrap around a portion of the seat assembly 10 to the back side of the seat assembly 10 and behind a corresponding frame when in the stowed position. An example of such a configuration is shown in FIG. 18. In FIG. 18, a single shield frame 124 is shown; however, it is contemplated that multiple shield frames 124 may be provided. As an example, two shield frames 124 may be provided that may be configured to deploy along opposing lateral sides of the seat assembly 10. For instance, the shield frames 124 may be provided in a stacked or layered arrangement in which one shield frame 124 may be disposed between a corresponding frame, such as the seat back frame 26, and the other shield frame 124. The shield frames 124 may deploy in opposite directions with respect to each other. It is also contemplated, that the shield frames 124 may be disposed simultaneously or independently. The shield frames 124 may also be curved near a location where the shield frame 124 wraps around from the back side of the seat assembly 10 to a lateral side.

Figure 17:
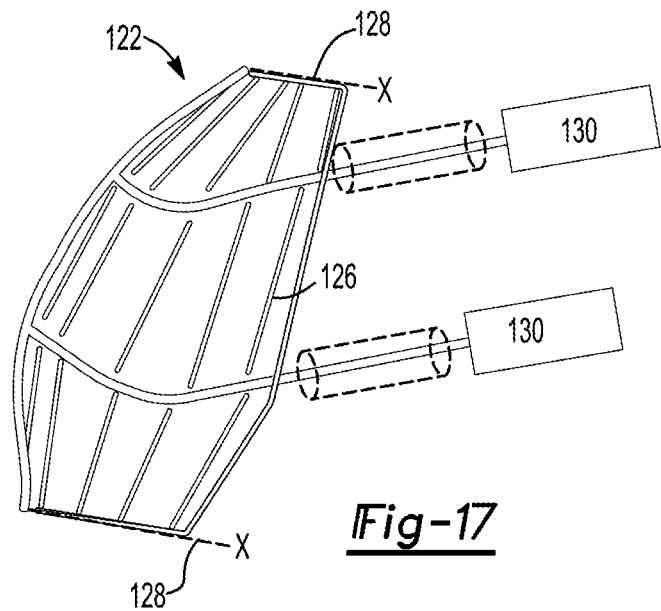
FIG. 17 illustrates the dynamically deployable shield of FIG. 16 with a flexible shield cover.

Referring to FIG. 17, a shield cover 126 may be disposed on the shield frame 124. The shield cover 126 may be made of any suitable material, such as a woven material like fabric or a non-woven material such as a polymeric film. The shield cover 126 may be stowed in a folded position or wound onto a spool prior to deployment in one or more configurations. For instance, the shield cover 126 may be folded along multiple bands or fold lines. The shield cover 126 may be partially mounted to the shield frame 124 or completely mounted to the shield frame 124. In a configuration where the shield cover 126 is partially mounted to the shield frame 124, a trailing end of the shield cover 126 may be coupled to or operatively connected to a corresponding frame of the seat assembly 10. Accordingly, the shield cover 126 may unfold when the deployable shield 122 is deployed and the shield frame 124 exits the seat assembly 10. The shield cover 126 may be completely mounted on the shield frame 124. In such a configuration, the shield cover 126 may not be folded and may attach to the perimeter of the shield frame 124 such that the shield cover 126 exits the seat assembly 10 with the shield frame 124.

Figure 15:
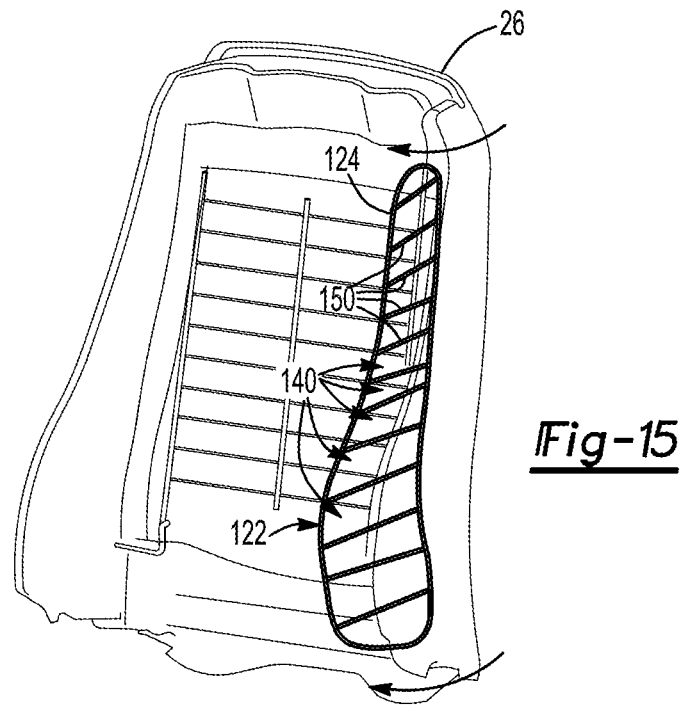
FIG. 15 is a perspective view of the portion of the seat back of FIG. 14 with the dynamically deployable shield in a deployed position.

The shield cover 126 may help capture a seat occupant 60 or may inhibit and appendage of a seat occupant 60 from extending through openings 140 in the shield frame 124, like those shown in FIG. 15. Moreover, the shield cover 126 may be placed in tension during deployment, which may help deflect the shield frame 124 and may help adjust the travel path of the shield frame 124 during deployment of the deployable shield 122.

It is also contemplated that an airbag 142 could be provided with a shield frame 124. For example, instead of providing a shield cover 126 or in addition to providing a shield cover 126, one or more airbags 142 may be provided that may be deployable from the shield frame 124 toward a seat occupant 60. An airbag 142 may be mounted to the shield frame 124 and may face toward or deploy toward a seat occupant 60 to help fill up the space between the shield frame 124 and the seat occupant 60. In at least one configuration, the airbag 142 may be deployed from the shield frame 124 has fully deployed or at least partially deployed from the seat assembly 10. For instance, the shield frame 124 may be deployed from a stowed position inside the seat assembly 10, such as inside the seat back 12 or seat bottom 14, such that the shield frame 124 exits the seat assembly 10. The airbag 142 may then be deployed once the shield frame 124 moves a sufficient distance such that deployment of the airbag 142 will not interrupt or inhibit deployment of the shield frame 124. Thus, the shield frame 124 may be deployed around a seat occupant 60 or in a manner that does not contact the seat occupant 60 while also supporting the airbag 142 and moving the airbag 142 or airbag deployment location outside the seat assembly 10. The airbag 142 may then deploy from the shield frame 124 to help fill the gap or space between the shield frame 124 and the seat occupant 60 to help absorb energy and constrain, support, and protect the seat occupant 60.

It is also contemplated that the shield frame 124 may be deployed and retracted without deploying an airbag 142. For instance, as discussed in more detail below a pre-impact collision assessment system may be used to deploy an occupant protection system having a deployable shield 122 when a vehicle impact event is predicted as being likely to occur. Such deployment may include deploying the shield frame 124 and then deploying an airbag 142 from the shield frame 124 when a vehicle impact event remains likely to occur. If conditions change and the pre-impact collision assessment system determines that a vehicle impact event becomes unlikely to occur, then the deployment sequence may be halted, interrupted, or reversed. For instance, if a vehicle impact event becomes unlikely after deployment of the shield frame 124 has started but before the airbag 142 is deployed, then deployment of the airbag 142 may be aborted. Optionally, the shield frame 124 may be subsequently retracted into the seat assembly or back to its pre-deployment position.

Figure 16:
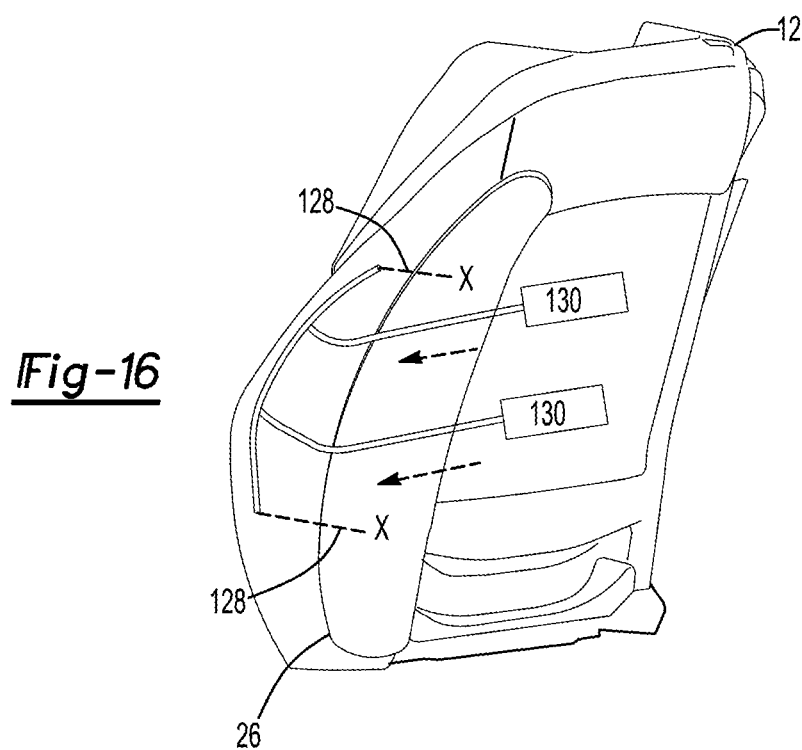
FIG. 16 is a perspective view of a seat back illustrating a dynamically deployable shield.

Referring to FIGS. 16 and 17, one or more guide members 128 may be provided with the deployable shield 122. In the configuration shown, two guide members 128 are provided that may be coupled to or operatively connected to the shield frame 124 and a corresponding frame or structure of the seat assembly 10. The guide members 128 may have any suitable configuration. For instance, the guide members 128 may be configured as cables, wires, filaments or the like. The guide members 128 may be selectively controlled to exert force on the shield frame 124. Such selective control may allow the guide members 128 to be provided with varying tension forces, which in turn may adjust the direction of deployment of the deployable shield 122.

Figure 23:
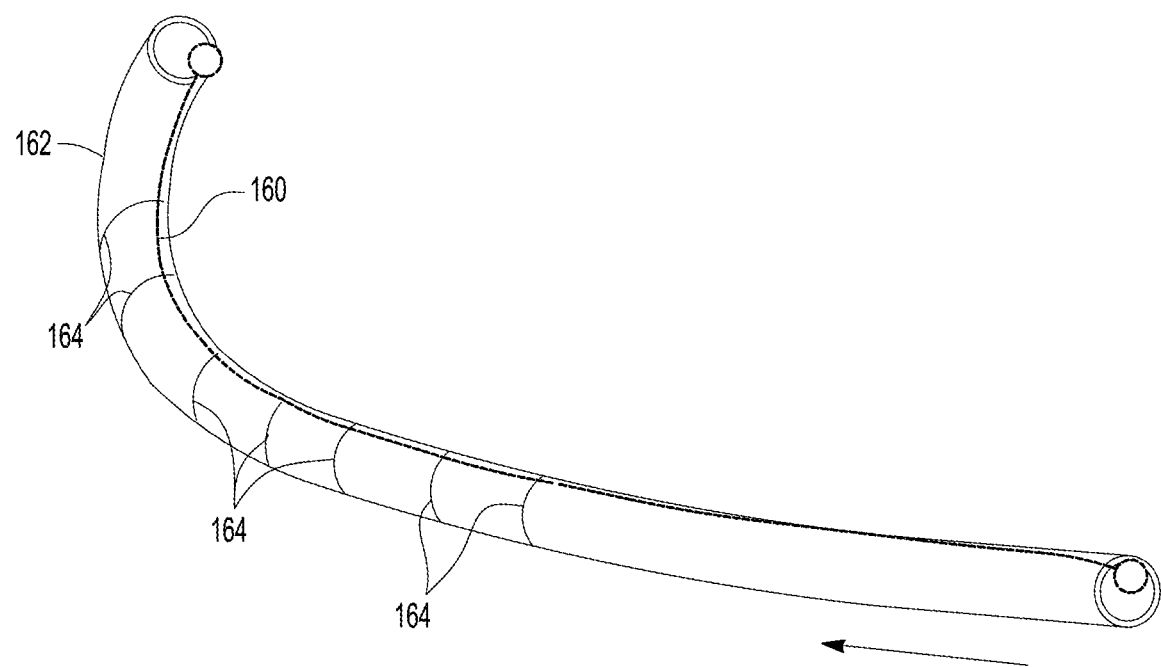
FIG. 23 illustrates an example of a mechanism for controlling the deployment direction of a dynamically deployable shield.

Referring to FIG. 23, one nonlimiting example of such a guide member 128 is shown. In this configuration, the guide member 128 may include a tensile member 160 and a sheath 162.

The tensile member 160 may be a cable or other suitable linkage and may extend through the sheath 162. The tensile member 160 may be attached at one or more ends to the sheath 162. For example, the tensile member 160 may be attached at opposing ends near opposite ends of the sheath 162. Alternatively, one end of the tensile member 160 may be attached to the sheath 162 near a distal end of the sheath 162 while the opposite end may be coupled to a tensioning device, such as a reel or school, or may be fixedly coupled to a corresponding frame of the seat assembly 10. In addition, the tensile member 160 may be attached continuously or at one or more points to the inside of the sheath 162, such as along an interior side or interior bending radius of the sheath 162 to help bend or direct the guide member 128.

The sheath 162 may be configured as a generally hollow tube or sleeve. The sheath 162 may extend along an arc or be configured to extend along an arc. In addition, the sheath 162 may be provided with a plurality of cuts, slots, perforations, or slits 164 that may facilitate bending of the sheath 162. For instance, a slit 164 may extend partially through the sheath 162 and may allow the sheath 162 to flex such that the slits 164 open in response to tensile force exerted by the tensile member 160. As such, the tensile member 160 and the sheath 162 may cooperate to allow the guide member 128 to flex or bend in proportion to the tensile force exerted by the tensile member 160. Accordingly, the guide member 128 may bend along an arc.

The slits 164 may be spaced apart from each other and may extend partially through the sheath 162 and to or toward the opening or passage in the sheath 162 that may receive the tensile member 160. The slits 164 may be disposed opposite the tensile member 160. For example, the slits 164 may be located along an outer side of the sheath 162 that may be located opposite the tensile member 160 such that the tensile member 160 may be disposed along the inner radius or inner concave side of curvature of the guide member 128 while the slits 164 may be disposed and may open along an opposing side of the sheath 162. The size of the slits 164 may help limit the amount of curvature of the sheath 162 during deployment. For instance, longer slits 164 or slits 164 having a greater depth may provide less resistance to bending than shorter slits 164 or slits that have a lesser depth or that may not extend to the passage in the sheath 162.

The guide member 128 may help control the deployment direction of the deployable shield 122. For instance, in a configuration in which the guide member 128 has a tensile member 160 that is coupled to the sheath 162 at opposing ends, the guide member 128 may exert force that may cause the deployable shield 122 to deployed along a curved or arcuate path. Such a curved or arcuate path may partially wrap around the seat occupant 60 and may help reposition or scoop a seat occupant 60 toward the central seating areas of the seat assembly 10.

In a configuration in which the guide member 128 has a tensile member 160 that is coupled to a tensioning device at one end, the tensioning device may be operated to adjust the amount of tension exerted by the guide member 128 on the deployable shield 122. Adjusting the amount of tensioning force may allow the deployment path of the deployable shield 122 to be dynamically adjusted during deployment. For instance, increasing the amount of tensioning force or reducing the effective length of the tensile member 160 may cause the deployable shield 122 to deploy along an arcuate or curved path having greater curvature as compared to a reduced amount of tensioning force or a longer effective length of the tensile member 160. It is further noted that the tensioning force may be determined prior to deployment or may be adjusted during deployment based on attributes such as the positioning of a seat occupant 60 as will be discussed in more detail below. In addition or alternatively, the tensioning device may be configured to trigger a material having shape memory to move, bend, or flex to its memory position. For instance, a material having shape memory may be triggered using attributes such as heat, electrical current, or the like. The shield actuator 130 may be mounted on a corresponding frame of the seat assembly 10.

Referring to FIGS. 16 and 17, one or more shield actuators 130 may be configured to deploy the deployable shield 122 from its stowed position to a deployed position that may be located outside of a corresponding trim cover. The shield actuator 130 may have any suitable configuration. For instance, a shield actuator 130 may be an electromagnetic, magnetic, electrical, electromechanical, mechanical or pyrotechnic device or combinations thereof. It is noted that configurations that do not employ a pyrotechnic device may help improve storage, handling, or transport and may avoid performance and durability issues that may be associated with the degradation of pyrotechnic agents, may help reduce noise levels at deployment as compared to pyrotechnic devices, and may eliminate exposure to heated gases or byproducts that may be released by a deployed pyrotechnic device.

Referring to FIGS. 14 and 15, an example of a deployable shield 122 in stowed and deployed positions is shown. In FIG. 14, the deployable shield 122 is shown in a stowed position. In the stowed position, the deployable shield 122 may be disposed under and may be concealed by a corresponding trim cover. In FIG. 15, the deployable shield 122 is shown in a deployed position. In the deployed position, the deployable shield 122 may move with respect to the stowed position and may sever a deployment seam in a corresponding trim cover to permit the deployable shield 122 to at least partially exit or deploy out of a portion of the seat assembly 10. As represented by the curved lines in FIG. 15, the deployable shield 122 may also move dynamically along its deployment path along a curve or arc in response to force exerted by one or more guide members 128.

Figure 19:
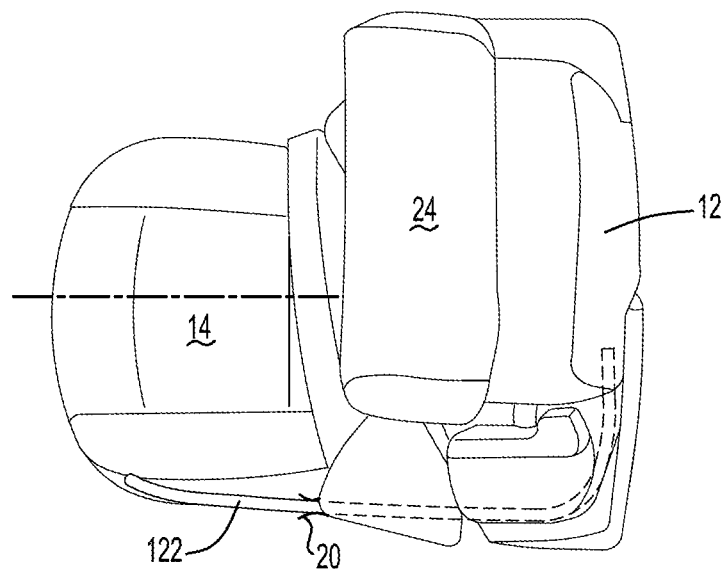
FIG. 19 is a top view of the seat assembly of FIG. 18 showing the dynamically deployable shield in a first deployed position.
Figure 20:
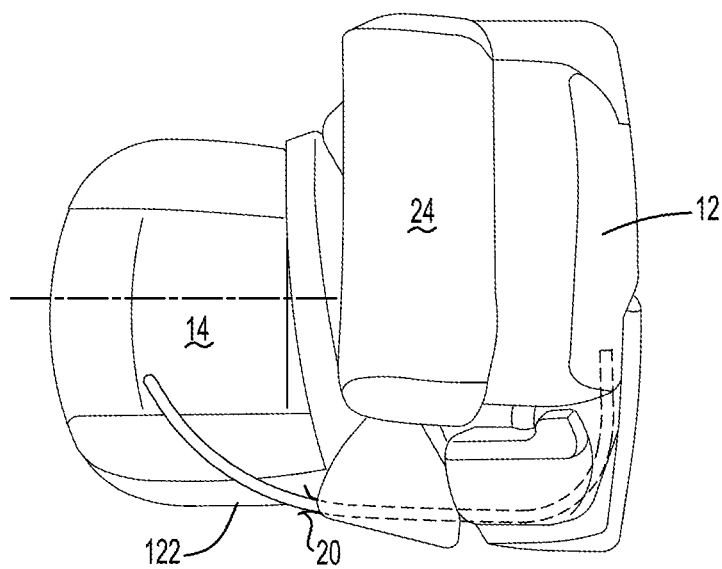
FIG. 20 is a top view of the seat assembly of FIG. 18 showing the dynamically deployable shield in a second deployed position.
Figure 21:
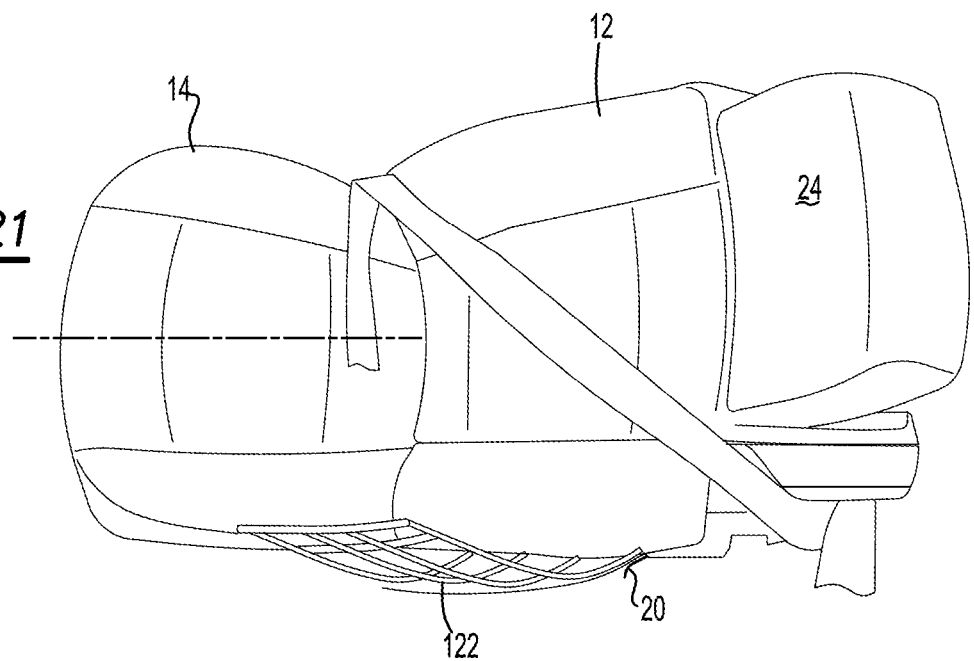
FIG. 21 is a front view of the seat assembly of FIG. 18 showing the dynamically deployable shield in the first deployed position.
Figure 22:
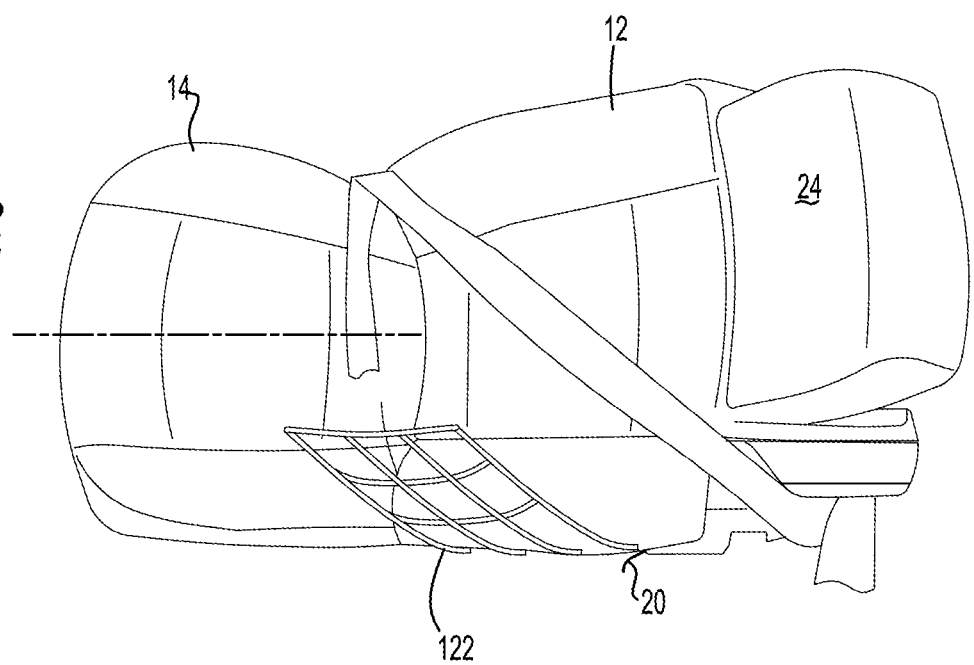
FIG. 22 is a front view of the seat assembly of FIG. 18 showing the dynamically deployable shield in the second deployed position.

Referring to FIGS. 19-22, examples of a dynamic deployment path are shown. In FIGS. 19 and 21, the deployable shield 122 shown in its direction of movement in response to operation of the shield actuator 130. In FIGS. 20 and 22, the deployable shield 122 is shown with an example of the additional movement that may result from the addition of dynamic deployment, such as may be provided by the tensioning device.

In FIGS. 20 and 22, the deployable shield 122 is depicted as moving inward toward the center of the seat assembly 10 in response to operation of the tensioning device; however, it is also contemplated that the tensioning device may be employed to actuate the deployable shield 122 in an outboard direction or combinations of inboard and outboard directions. For instance, in a seat having multiple guide members 128 or multiple regions were pieces of material having shape memory, different guide members 128 or shape memory regions may be independently operated or independently activated to provide different biasing forces on the deployable shield 122. Accordingly, the deployable shield 122 may twist or move inboard or outboard by different magnitudes in response to forces exerted by different guide members 128.

Operation of an occupant protection system may be controlled by a control system that may have one or more controllers. Such controllers may be microprocessor-based. The control system may be associated with or may communicate with one or more sensors or systems. Such sensors or systems may include vehicle impact sensors, a pre-impact collision assessment system, seat occupant sensors, or combinations thereof.

A vehicle impact sensor, such as a crash sensor, may be provided with a vehicle and may detect force associated with a vehicle impact event. The vehicle impact sensor may be of any suitable type as is known by those skilled in the art.

The pre-impact collision assessment system may be configured to detect a potential collision or impact with the vehicle before it occurs. The pre-impact collision assessment system may be of any suitable type. For instance, the pre-impact collision assessment system may employ radar, lidar, vision sensing, inter-vehicle communication, or combinations thereof as is known by those skilled in the art.

One or more seat occupant sensors may be provided with the seat assembly 10. One or more seat occupant sensors may be configured to detect dimensional information associated with the seat occupant 60, such as the width of the seat occupant 60 at various regions, such as near or at the head, shoulders, hips, legs, or combinations thereof. In addition, one or more seat occupant sensors may help detect the positioning or orientation of a seat occupant 60. The seat occupant sensors may be of any suitable type, such as pressure sensors, capacitive sensors or the like. In addition, it is contemplated that one or more seat occupant sensors may be visual or sonic sensors. For instance, one or more cameras may be provided in the vehicle that may detect a seat occupant 60 and may detect the positioning and or dimensional characteristics of the seat occupant 60. As another example, sonic sensors that may emit a sonic signal, such as an ultrasonic signal that may not be audible to a seat occupant 60, may detect positioning and/or dimensional characteristics of the seat occupant 60 based on reflected signals. The control system may continuously or periodically poll the seat occupant sensors to provide such information about a seat occupant 60.

The control system may utilize information from the vehicle impact sensors, a pre-impact collision assessment system, seat occupant sensors, or combinations thereof to help determine when and how to operate an occupant detection system. For instance, the control system may determine when to deploy the occupant detection system in response to the detection of a vehicle impact based on data from the vehicle impact sensors or in response to a predicted vehicle impact event based on data from the pre-impact collision assessment system. Furthermore, data from the vehicle impact sensors or the pre-impact collision assessment system may be used to determine the magnitude and/or direction of an actual or predicted vehicle impact event.

Data from the vehicle impact sensors or the pre-impact collision assessment system may then be utilized to help intelligently deploy or operate the occupant detection system. For instance, the occupant protection system may be deployed in a predetermined manner when an actual or predicted vehicle impact event is detected. Alternatively, the occupant detection system may be deployed in a manner that helps provide a greater degree of occupant protection in a location or direction disposed closest to the actual or predicted point of impact associated with a predicted or actual vehicle impact event.

Moreover, the occupant detection system may be deployed in a manner that may help scoop or move a seat occupant 60 away from an actual or predicted vehicle impact location to help better protect a seat occupant 60. As another example, the occupant protection system may be deployed along a dynamic travel path in a manner to help avoid interference or contact with the seat occupant 60 prior to completing deployment, thereby allowing the occupant protection system to reach full deployment prior to contacting a seat occupant 60, which may help better protect the seat occupant 60. For example, data regarding the width of a seat occupant or position of a seat occupant from the seat occupant sensors may be used to control deployment of the occupant protection system such that the occupant protection system may deploy around the detected location of the seat occupant 60 or the width of the seat occupant 60, which may help reduce or prevent the seat occupant 60 from deflecting the deployed shield or otherwise interfering with or blocking the deployment of the shield, which otherwise may inadvertently alter the deployment direction in a less desired manner or away from the desired deployment path.

The control system may also be configured to control the timing and rate of deflation of occupant protection systems that employ inflatable devices. As such the control system may intelligently control deflation rates and may also intelligently control inflation rates in a manner that provides enhanced protection for different seat occupant or different seat assemblies.

It is also contemplated that the control system may detect the orientation or rotational position of the seat assembly 10 with respect to a longitudinal axis of the vehicle. This orientation or rotational position information may allow the control system to determine the orientation a rotational position of the seat assembly with respect to the actual or predicted vehicle impact event. Accordingly, the control system may then determine the proximity of a seat assembly 10 with respect to the actual or predicted impact location.

Notwithstanding the vehicle impact sensors or the pre-impact collision assessment system, the sensors, control system, and other attributes of the occupant protection system may be self-contained within the seat assembly 10, thereby allowing these components to be integrated in a modular fashion with the seat assembly 10 rather than being provided with a distributed architecture. This may help avoid or reduce associated system integration issues and potential costs and the number of interconnections or interface points.

It is also contemplated that various signals, such as audible signals, visual warnings, or haptic signals may be communicated to a seat occupant 60 to warn the seat occupant 60 of the impending deployment of the occupant protection system and the predicted or actual vehicle impact event.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A seat assembly comprising:
an occupant protection system having a deployable shield that is deployable along a dynamic deployment path based on a detected position of a seat occupant, wherein the deployable shield is deployable from inside the seat assembly to outside the seat assembly and includes a shield frame that has a plurality of frame members that define a plurality of openings in the shield frame, wherein the deployable shield includes a guide member that is mounted to a seat back of the seat assembly and to the shield frame, the guide member includes a sheath and a tensile member that extends through the sheath, and the sheath has a plurality of slits that extend partially through the sheath that allow the sheath to flex in response to tensile force exerted by the tensile member.

2. The seat assembly of claim 1 wherein the shield frame is received inside a shield cover that deploys with the shield frame.

3. The seat assembly of claim 1 wherein the shield frame is deployable from the seat back of the seat assembly is at least partially disposed along a back side of the seat back prior to deployment and extends in front of the seat occupant after deployment.

4. The seat assembly of claim 1 wherein the deployable shield includes a shield cover that inhibits the seat occupant from passing through the plurality of openings when the deployable shield is deployed.

5. The seat assembly of claim 4 wherein the shield cover is only mounted to the shield frame.

6. The seat assembly of claim 4 wherein the shield cover is in tension during deployment of the deployable shield and adjusts a travel path of the shield frame during deployment of the deployable shield.

7. The seat assembly of claim 1 wherein the guide member exerts force on the shield frame that directs deployment of the deployable shield toward a center plane of the seat assembly in front of the seat occupant.

8. The seat assembly of claim 1 wherein the tensile member is attached to the sheath at one or more points inside the sheath to bend the guide member upon deployment.

9. The seat assembly of claim 1 wherein the sheath extends along an arc that is non-linear and extends between opposing ends of the sheath, the tensile member is disposed inside the sheath along an inner concave side of the arc of the sheath, and the slits are disposed along an opposing side of the sheath.

10. The seat assembly of claim 8 wherein the slits are spaced apart from each other and are disposed along a side of the sheath that is located opposite the tensile member.

11. The seat assembly of claim 8 wherein the tensile member is disposed inside the sheath along an inner concave side of the sheath and the plurality of slits are disposed along an opposing side of the sheath.

12. The seat assembly of claim 1 wherein the dynamic deployment path of the deployable shield is adjusted by reducing an effective length of the tensile member.

13. The seat assembly of claim 1 wherein the shield frame is completely disposed inside the seat assembly prior to deployment.

14. The seat assembly of claim 13 wherein the shield frame is disposed along a back side of the seat back and a lateral side of the seat back prior to deployment.

15. The seat assembly of claim 14 wherein the shield frame extends along an arc as the shield frame extends around the back side of the seat back to the lateral side of the seat back.

16. The seat assembly of claim 13 the shield frame is disposed along a lateral side of the seat back prior to deployment.

17. The seat assembly of claim 16 wherein the shield frame is only disposed along the lateral side prior to deployment.

18. The seat assembly of claim 16 further comprising a pair of shield actuators that are disposed proximate the back side of the seat back, wherein the pair of shield actuators are operable to deploy the shield frame out of the seat back.

19. The seat assembly of claim 16 further comprising first and second guide members that extend between the shield frame and the seat back, wherein the first guide member is coupled to a top of the shield frame and the second guide member is coupled to a bottom of the shield frame that is disposed opposite he top of the shield frame.

* * * * *